April 5, 1932.  H. MYERS  1,852,470
SIDE DRAFT REDUCING DEVICE FOR BINDERS AND OTHER AGRICULTURAL IMPLEMENTS
Filed Feb. 20, 1931
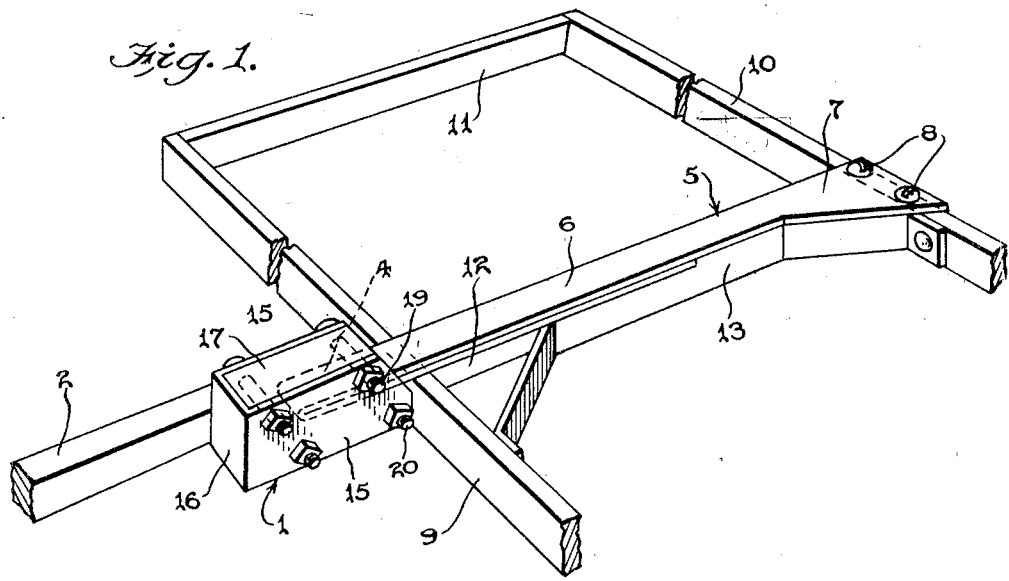
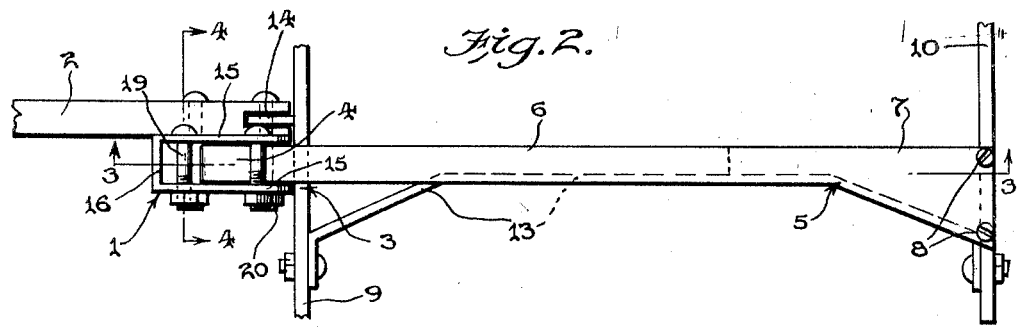
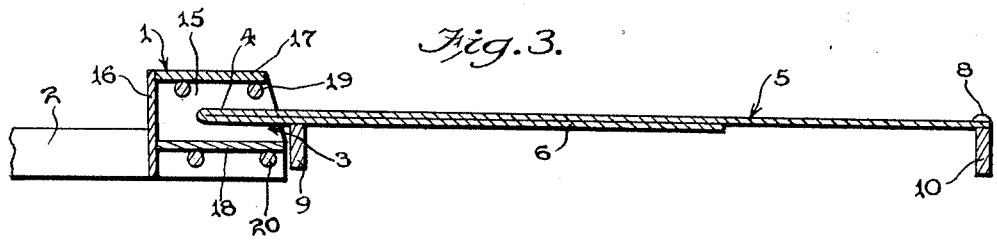
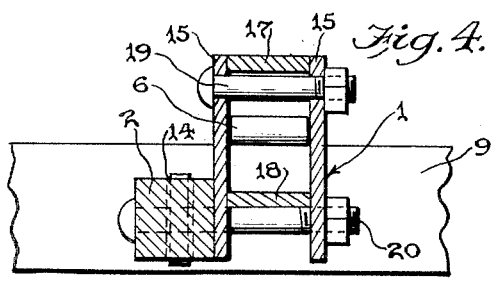
Inventor
Herman Myers,
By
Attorney Patented Apr. 5, 1932

1,852,470

UNITED STATES PATENT OFFICE

HERMAN MYERS, OF ROCHESTER, MINNESOTA

SIDE DRAFT REDUCING DEVICE FOR BINDERS AND OTHER AGRICULTURAL IMPLEMENTS

Application filed February 20, 1931. Serial No. 517,284.

The invention relates to a side draft reducing device for binders and other agricultural implements and analogous machines, and the present application is filed to take the place of, and is a continuation in part as to common subject matter of an application, Serial No. 433,787, filed by me March 6, 1930, for a draft attachment for binders and other agricultural implements.

The object of the present invention is to provide for binders and other agricultural implements and machines a simple, practical, and efficient side draft reducing device of great strength and durability and of comparatively inexpensive construction, which may be easily applied to an ordinary binder without requiring any modification of the construction of the same and which will be capable of reducing to a minimum side draft and which will not only relieve the draft animals of the strain incident to such side draft, but which will enable the draft animals to turn such machines more easily and facilitate their handling by the driver.

With the above and other objects in view, the invention consists in the construction and novel combination and arrangement of parts hereinafter described, illustrated in the accompanying drawings, and set forth in the claims hereto appended, it being understood that various changes in the form, proportion and minor details of construction, within the scope of the claims, may be resorted to without departing from the spirit of the invention or sacrificing any of the advantages thereof.

In the drawings:

Figure 1 is a perspective view of a portion of a binder equipped with a side draft reducing device embodying the invention.

Fig. 2 is a plan view of the complete device associated with the tongue and the adjacent portions of the main frame of the binder, the box being in section.

Fig. 3 is a longitudinal sectional view on the line 3—3 of Fig. 2.

Fig. 4 is a transverse sectional view on the line 4—4 of Fig. 2.

In the accompanying drawings, in which is illustrated the preferred embodiment of the invention, the side draft reducing device comprises in its construction a box 1 rigidly secured to the draft tongue 2 of the binder and located at one side thereof and open at its rear end at 3 to receive the front end 4 of a side draft reducing plate 5 which is composed of a relatively narrow front portion 6 and a forwardly tapered rear portion 7 which is rigidly secured by bolts 8 or other suitable means to the rear portion of the main frame of the binder. The relatively narrow front portion 6, which is laterally reduced to enable it to extend into the open rear end of the box 1, is unattached to the front portion of the main frame of the binder so that the side draft reducing plate 5 operates in the nature of a relatively long lever, and by being attached to the rear portion of the main frame of the binder will enable the side draft to be contracted and reduced to a minimum by means of a comparatively small amount of force exerted by the tongue adjacent to the pivotal point thereof so that the tongue will also operate as a relatively long lever in resisting side draft of the machine. By this construction and arrangement, the side draft will be reduced to a minimum and the draft animals will be practically relieved of strain of the same and will be enabled to turn and otherwise handle a binder or other agricultural machine or implement with great ease.

The main frame of the binder, which may, of course, be of any desired construction, and which is partially illustrated in the accompanying drawings, includes front and rear transverse bars 9 and 10, longitudinal bars 11 and 12, and a longitudinal brace 13. Any other suitable arangement of framework may be employed, as will be readily understood.

The side draft reducing plate or member 5, which may be constructed of any suitable metal, is preferably made of heavy sheet metal, and the narrow front portion is composed of two plies or thicknesses formed by bending the metal back upon itself at the lower face of the side draft reducing plate. This increases the thickness of the narrow front portion and the strength of the same, but these results may be obtained in any other desired manner, as will be readily understood. The front end 4 of the side draft reducing plate extends in advance of the rear end of the tongue and is arranged in overlapping relation with the same. The rear end of the tongue is hinged or pivoted at 14 to the frame of the binder to permit adjustment of the binder in the usual manner, and the box is sufficiently high to allow upward and downward movement of the side draft reducing plate incident to the adjustment of the binder. While the box is shown in the accompanying drawings for guiding the side draft reducing plate in its upward and downward movement, any other equivalent guiding means which will prevent relative lateral movement of the side draft reducing plate and the tongue may be employed.

The box 1, which may be secured to the tongue at the side thereof in any desired manner, is composed of side walls or members 15, an integral front connecting wall 16, and top and bottom walls 17 and 18 which extend across the space between the side walls and which are suitably secured between the same. The side walls are shown connected by upper and lower bolts 19 and 20, the lower bolts 20 being extended through the tongue and having heads located at the opposite faces of the tongue from that at which the box is placed, but any other suitable fastening means may be employed, and as the front end of the side draft reducing plate is located between the side walls 15 and between the bottom wall and the top wall thereof, the box will permit upward and downward movement of the side draft reducing plate incident to the adjustment of the binder. The space between the top and bottom walls of the box is sufficient to permit the tongue to rest upon the ground when the draft animals are unhitched from the said tongue.

What I claim is:

1. In a machine of the class described, the combination with a main frame and a draft tongue hinged to the main frame, of a side draft reducing plate rigidly secured at its rear portion only to the main frame at the rear thereof and extending forwardly therefrom to a point adjacent the rear end of the tongue, and means for holding the side draft reducing plate and the tongue against relative lateral movement and for also permitting upward and downward movement of the said plate.

2. In a machine of the class described, the combination with a main frame and a draft tongue hinged to the main frame, of a side draft reducing plate rigidly secured at its rear portion only to the main frame at the rear thereof and extending forwardly therefrom to a point adjacent the rear end of the tongue, and means for holding the side draft reducing plate and the tongue against relative lateral movement, said means being carried by one of said parts and permitting upward and downward movement of the said plate.

3. In a machine of the class described, the combination with a main frame and a draft tongue hinged to the main frame, of a side draft reducing plate rigidly secured at its rear portion only to the main frame at the rear thereof and extending forwardly therefrom to a point adjacent the rear end of the tongue, and means for holding the side draft reducing plate and the tongue against relative lateral movement, said means being carried by the tongue and permitting upward and downward movement of the plate.

4. In a machine of the class described, the combination with a main frame and a draft tongue hinged to the main frame, of a side draft reducing plate rigidly secured at its rear portion only to the main frame at the rear thereof and extending forwardly therefrom to a point in rear of the tongue and arranged in overlapping relation with the same, and spaced vertical side members carried by the tongue and located at opposite sides of and engaged by the front portion of the side draft reducing plate and permitting upward and downward movement of the plate.

5. In a machine of the class described, the combination with a main frame and a draft tongue hinged to the main frame, of a side draft reducing plate rigidly secured at its rear portion only to the main frame at the rear thereof and extending forwardly therefrom to a point in rear of the tongue and arranged in overlapping relation with the same, and a box carried by the tongue and open at its rear end and receiving the front end of a side draft reducing plate and having spaced side walls for engaging the same, said box permitting upward and downward movement of the side draft reducing plate while holding the plate and the tongue against relative lateral movement.

6. In a machine of the class described, the combination with a main frame, and a draft tongue hinged to the main frame, of a side draft reducing plate rigidly secured at its rear portion only to the main frame at the rear thereof and extending forwardly therefrom to a point in rear of the tongue and arranged in overlapping relation with the same, and a box secured to the tongue at one side thereof and having an open rear end receiving the front end of the side draft reducing plate and having spaced side walls engaging the front portion of the side draft reducing plate, said box having top and bottom walls spaced apart to permit upward and downward movement of the side draft reducing plate.

7. In a machine of the class described, the combination with a main frame and a draft tongue hinged to the main frame, of a side draft reducing plate rigidly secured at its rear portion only to the main frame at the rear thereof and extending forwardly therefrom to a point adjacent the rear end of the tongue, and a connecting means between the tongue and plate.

In testimony whereof I have hereunto set my hand this 19th day of February, 1931.

HERMAN MYERS.